United States Patent [19]

Hamlin

[11] 4,022,353
[45] May 10, 1977

[54] NON-SHEARING METERING DISPENSER FOR SHELL LOADING MACHINES

[75] Inventor: Robert N. Hamlin, Stillwater, Minn.

[73] Assignee: Remington Arms Company, Inc., Bridgeport, Conn.

[22] Filed: Nov. 28, 1975

[21] Appl. No.: 635,897

[52] U.S. Cl. .............................. 222/276; 222/330; 222/351

[51] Int. Cl.² ........................................ G01F 11/10

[58] Field of Search .......... 222/345, 346, 347, 349, 222/351, 361, 362, 276, 330

[56] References Cited

UNITED STATES PATENTS

| 345,198 | 7/1886 | Wesson | 222/349 X |
|---|---|---|---|
| 1,106,686 | 8/1914 | Swarovski et al. | 222/361 X |
| 2,113,091 | 4/1938 | Mills | 222/361 X |
| 2,332,938 | 10/1943 | Schmidberger | 222/361 |
| 3,602,401 | 8/1971 | Lense | 222/345 X |

FOREIGN PATENTS OR APPLICATIONS 1,237,209  6/1960  France ..........................222/361

Primary Examiner—Robert B. Reeves
Assistant Examiner—Frederick R. Handren
Attorney, Agent, or Firm—John H. Lewis, Jr.; Nicholas Skovran; William L. Ericson

[57] ABSTRACT

A dispenser for metering predetermined charges of shot or other particulate material by means of a slidable charging plate, incorporates a shear slide device which prevents shot that become trapped between a supply hopper and the charging plate from either jamming the charging plate or being sheared into irregular pieces. The device also withholds the trapped shot from the metered charge, and thereby increases the uniformity of the quantities metered.

10 Claims, 15 Drawing Figures

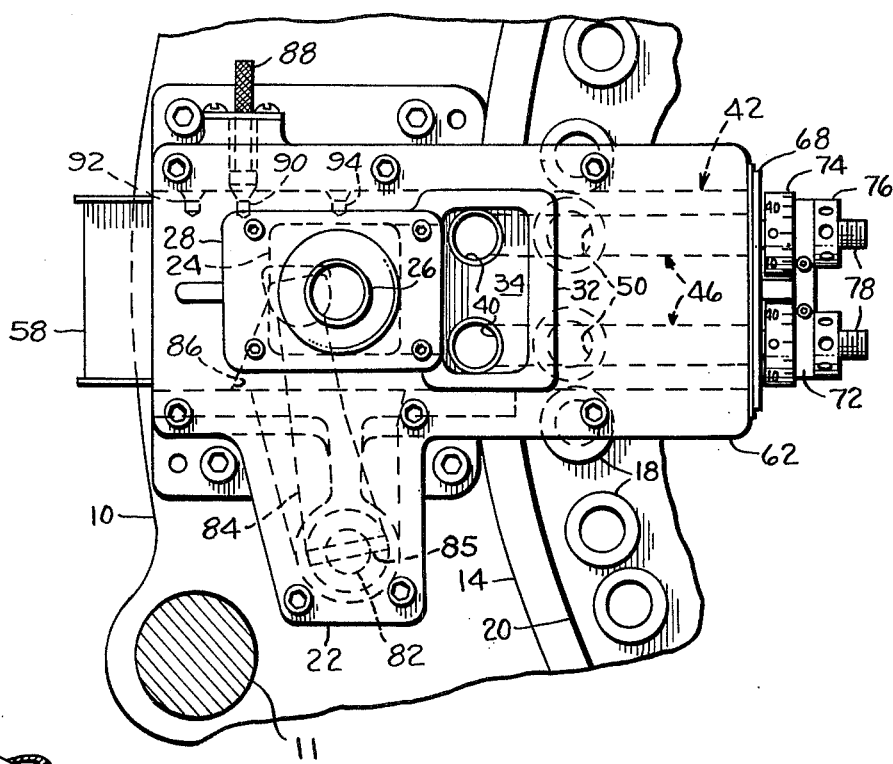
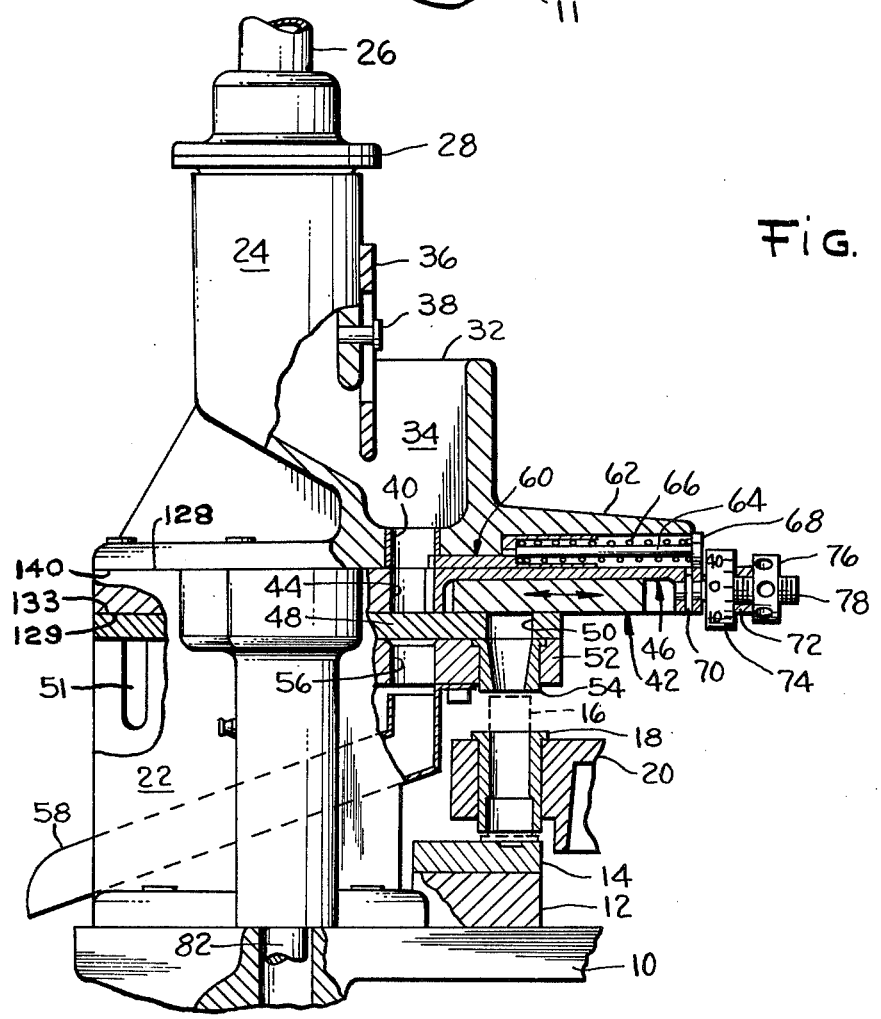

NON-SHEARING METERING DISPENSER FOR SHELL LOADING MACHINES

BACKGROUND OF THE INVENTION

The present invention pertains generally to an improvement in dispensers for metering out particulate materials such as shot, metal or plastic parts, medicinal capsules and other items which it is desired to measure and divide into accurately predetermined quantities without damaging or jamming the materials in the metering device. The invention finds special application to machines for loading shotshells, but is not limited to that use alone.

A typical shotshell loading machine of a kind in current use is described by U.S. Pat. No. 2,663,421 to Reynolds et al, which has now expired. A shot dispenser or charger according to that patent feeds shot by gravity from a hopper into a metering trap chamber formed in a slidable charging plate, which is then moved to align the trap chamber with a tunnel through which the shot drops into a waiting shell.

The charging plate is reciprocated to transfer the trap chamber back and forth between the hopper and the funnel, and thus meters out successive hopefully-equal charges of shot, whose volume is intended to be predetermined by the size of the trap chamber. The hopper outlet is sealed off by the upper surface of the charging plate to stop the flow of shot each time the trap chamber slides away from the outlet. Often, however, one or more extra shot become trapped between the outlet and the sliding surface of the plate, and interfere with the sliding motion; this because the clearance between the hopper and the plate must necessarily be less than the diameter of the shot, to keep the shot from escaping. In the case of a material having a relatively low shear strength, such as lead shot, this interference does not jam the dispenser; the charging plate merely severs the interfering shot, whose cutoff bottom fragments fall into the trap chamber and are then discharged into the shell. This represents some waste of shot, since the irregular fragments will of course not follow a normal, predictable trajectory when the shell is fired. The destruction of a portion of some products dispensable into measured packages by such a mechanism, e.g. screws or medicinal capsules, would represent a more severe loss. In connection with loading lead shot, however, this drawback has been accepted for many years, as no satisfactory solution has been presented in this type of metering device.

At the present time, there is considerable concern about the recently-discovered penchant of ducks and other aquatic fowl to swallow lead shot accumulated in marshy hunting areas. The ingested shot become disintegrated in the fowl's craw, and are thought to result eventually in lead poisoning. Attention has therefore turned to proposals for substitution of steel shot, or combination iron and lead shot, to avoid this possibility. Various coatings for lead shot have also been proposed, but a duck's craw is a very effective grinding mechanism, being filled with sand and grit for this very purpose, so that any known coatings are soon worn away. There is no clear indication as yet that steel or iron shot will be adopted as a standard load for waterfowl, for the reason that the lesser density of these materials reduces the impact energy of the individual shot pellets; in consequence, it may develop that their use gives rise to an increased incidence of crippling wounds which could result in delayed deaths as wasteful and cruel as any caused by lead poisoning. Be that as it may, extensive use of steel shot is anticipated, in the hope of overcoming the problem.

Steel and iron shot cannot be satisfactorily metered out by the conventional shot dispensers previously described, as the shear strength is too great; either the charging plate jams on interfering shot, or something must yield, and the plate becomes damaged very quickly.

PRIOR ART

U.S. Pats. No. 398,650 issued to G. M. Peters on Feb. 26, 1889, and 2,369,251 issued to W. S. Reynolds on Feb. 13, 1945, both disclose shotshell loading machines which are of import similar to the aforementioned U.S. Pat. No. 2,663,421 so far as the present invention is concerned. Several U.S. patents in the art of seed planters may also be noted:

U.S. Pat. No. 236,293 — F. A. Barr — Issued Jan. 4, 1881

U.S. Pat. No. 240,463 — M. Runstetler — Issued Apr. 19, 1881

U.S. Pat. No. 16,597 — J. Landes — Issued Feb. 10, 1857

U.S. Pat. No. 144,327 — J. M. Forden — Issued Nov. 4, 1873

U.S. Pat. No. 200,684 — M. Barbour — Issued Feb. 26, 1878

U.S. Pat. No. 529,686 — A. Wehrman — Issued Nov. 20, 1894

U.S. Pat. No. 1,051,075 — M. J. Breen — Issued Jan. 21, 1913

U.S. Pat. No. 1,557,019 — J. A. Burcham — Issued Oct. 13, 1925

BRIEF DESCRIPTION OF THE INVENTION

The present invention is directed to a means for correcting certain difficulties with metering dispensers of the general type exemplified by the aforementioned U.S. Pat. No. 2,663,421. It is an object of the invention to improve dispensers of this nature by overcoming their tendency either to shear some of the shot or other particles, or to become jammed or damaged by interference with the shot if the material is too tough to be readily sheared. It is a further object to increase the uniformity of the volumes metered by such dispensers. It is another object to reduce the destructive waste of particulate materials metered in this fashion. Further objects and advantages of the invention will appear as the following description proceeds.

Briefly stated, according to a preferred embodiment, I carry out my invention in part by providing a yieldable shear slide means which is interposed between a slidable charging plate and a shot supply hopper. The hopper, shear slide, charging plate, and a control plate under the charging plate have closely fitting surfaces which confine the shot but permit the parts to move reciprocably relative to one another. The charging plate is reciprocable between a first position in which a trap chamber of predetermined volume formed in the plate communicates with an outlet of the supply hopper to receive a charge of shot by gravity, and a second position in which the trap chamber communicates with a discharge port to pour the shot charge into a waiting shotshell. The shear slide is reciprocable parallel to the charging plate between a normal position and retracted positions, being biased by a spring toward the normal position. A lip formed on the shear slide cooperates with the supply hopper outlet and the trap chamber to define a loading passage, when the charging plate is in its first or shot-receiving position.

The shear slide may be mounted either on the hopper or on the charging plate, and normally maintains a fixed position relative to the part which mounts it. As the charging plate moves the trap chamber away from the hopper outlet and the loading passage consequently becomes progressively occluded, one or more shot are apt to become trapped between the moving parts. However, these shot are trapped between the lip of the shear slide and the part which is moving relative to it, rather than between the charging plate and the hopper. Continuing movement merely displaces the shear slide against its yielding bias, and therefore does not shear the trapped shot, but rather holds it in place against the lip; the trapped shot is not released into the discharge funnel when the charging slide reaches the end of its stroke, but is retained by the lip until the trap chamber is restored into alignment with the hopper outlet. The trapped shot is thus held back and not allowed to add an excess to the desired volume metered by the trap chamber.

DESCRIPTION OF THE DRAWINGS

While the specification concludes with claims particularly pointing out the subject matter which I regard as my invention, it is believed that a clearer understanding may be gained from the following detailed description of preferred embodiments, referring to the accompanying drawings, in which:

FIG. 1 is a fragmentary view in side elevation and partially in cross section of a portion of a shot shell loading machine incorporating a first form of the improved metering dispenser;

FIG. 2 is a fragmentary plan view of the machine of FIG. 1;

FIG. 3 is a fragmentary sectional view in side elevation of another embodiment having two hopper outlets and two trap chambers delivering to a single common discharge port, which permits the rate of delivery of shot charges to be doubled;

DESCRIPTION OF THE PREFERRED EMBODIMENTS

Figure 3:
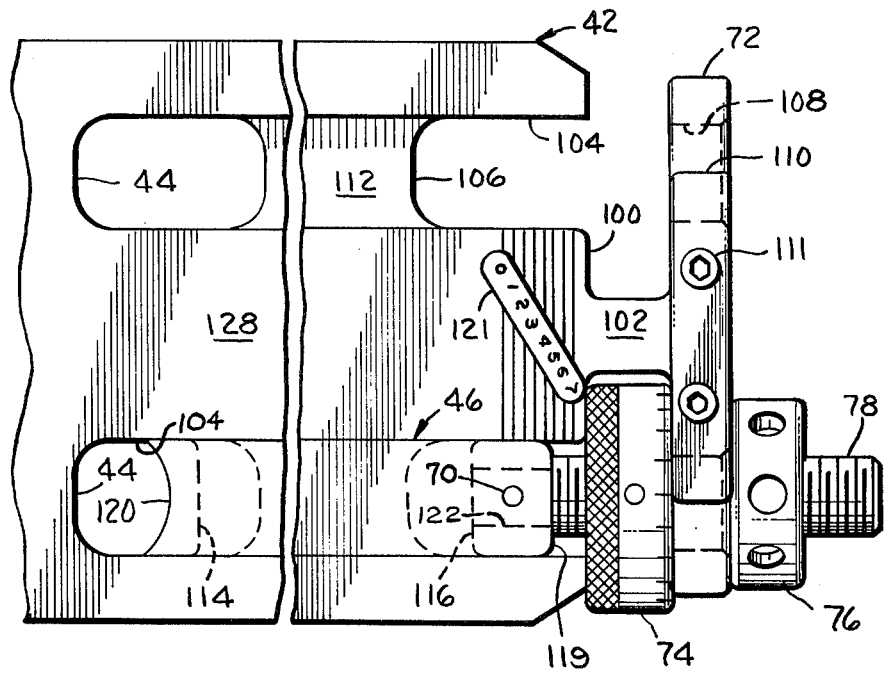
FIG. 3 is a fragmentary plan view of a charging plate assembly of the dispenser.

Referring first to FIGS. 1 and 2, a first form of the improved metering dispenser is shown incorporated in a shotshell loading machine of a type more fully disclosed in the aforementioned U.S. Pat. No. 2,663,421. This machine is assembled on a deck 10 having supporting posts 11. A bolster 12 and a rail 14 provide a circular rack for supporting a series of empty shotshells 16 for loading. The shotshells are transported about the rail by a series of shell pockets 18 mounted in a rotary indexing dial 20, which transfers the shotshells intermittently to successive stations for loading powder, wads, and shot, and for inspecting and closing the shotshells, all in a well-known manner, the machine shown is of the so-called duplex type, having its pockets 18 arranged in pairs to position two shotshells at each of the successive operating stations for simultaneous loading operations. Portions of the machine other than the shot-metering dispenser or charger form no part of the present invention and will not be described further.

The shot dispenser is mounted in a housing 22, which supports a shot hopper 24 connected by coupling flanges 28 with a tube 26 for supplying the hopper with shot from any suitable source. The hopper is formed with a shot reservoir 34, having an open surge chamber 32. The depth of the column of shot in the surge chamber is regulable by a slotted depth control slide 36, whose vertical position is adjustably fixed by screws 38, to maintain an appropriate degree of downward pressure for feeding shot freely through a pair of bushed outlet openings 40 at the bottom of the hopper 24.

Figure 4:
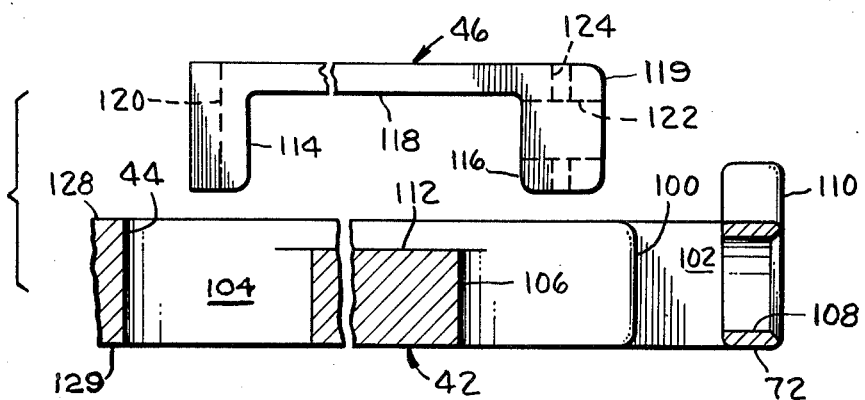
FIG. 4 is an exploded view in side elevation of some of the elements of the charging plate assembly of FIG. 3.
Figure 5:
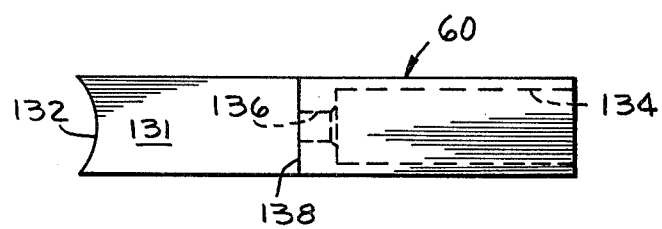
FIG. 5 is a plan view of a shear slide member of the dispenser.

A charging plate 42, which is shown in greater detail in FIGS. 3 and 4, has an upper planar surface 128 and a lower parallel planar surface 129, which conformably engage a lower planar surface 140 of the hopper 24 and a parallel upper planar surface 133 of a control plate 48, respectively, to permit reciprocable sliding movement of the charging plate in the directions shown by the arrows in FIG. 1. The charging plate 42 is formed with a pair of trap chambers 44 which, by reciprocation of the plate, are movable in a direction radial to the dial 20 between first positions aligned with the outlet openings 40, and second positions aligned with a pair of shot discharge ports 50 formed in the control plate 48. The charging plate is reciprocated between these positions by a rocking lever 84 (see FIG. 2) engaged in a slot 86 in the plate, and drivingly connected by a pin 85 with a shaft 82 oscillated by suitable motive means (not shown). In the first position of the charging plate, the trap chambers 44 and the aligned outlet openings 40 combine to form loading passages into which shot pour by gravity from the reservoir 34. Movement of the plate 42 to the right in FIG. 1 occludes the openings 40 and transports charges of shot, metered by the volumes of the trap chamber 44, to the discharge ports 50, which are normally aligned above funnels 54 mounted in a support 52 and opening downwardly to drop the shot charges into waiting shotshells 16.

Provision is made for temporarily stopping the dispensing of shot, or for emptying the hopper 24, by moving the control plate 48 away from its illustrated normal position. A lock-pin 88 (see FIG. 2) normally engages a recess 90 in one side of the control plate to hold it in the illustrated position, but may be withdrawn to permit movement of the control plate by a handle 51 (see FIG. 1) to two other positions in which the lock-pin engages in either of two alternate recesses 92 or 94. With the pin 88 in the recess 94, the ports 50 are aligned between the loading passages 40, 44 and a pair of drain holes 56 in the support 52, so that the shot supply can be removed from the hopper 24 through a chute 58. With the pin 88 in the recess 92, the discharge ports 50 fall outside the range of reciprocating movement of the trap chambers 44 so that no shot will be dispensed.

The volume of shot receivable by the metering trap chambers 44 is adjustably determined by a pair of blocks 46, each of which is slidably received in one of a pair of slots 104 (see FIGS. 3 and 4) in the charging plate 42, and has an arcuate lip 120 formed in a leg 114 depending therefrom to cooperate with an arcuate inner end portion of the corresponding slot 104 to define a trap chamber 44. For greater clarity, only one of the two blocks 46 is shown in FIGS. 3 and 4. Each block 46 has a lower flat surface 118 for sliding support on a flat surface 112 formed on a web 106 spanning the corresponding shot 104, and a second depending leg 116 formed with a flat end surface 119 for cooperation with a visible scale 121 to indicate the adjusted volumes of the trap chambers. An adjusting screw 78 is received in a bore 22 in each block 46, and is secured by a taper pin 70 passed through a hole 124 and the screw. A T-shaped extension 72 is joined to the plate 42 by a connecting web 102, and has bores 108 through which the adjusting screws 78 pass. Recesses 100 are defined between the extension 72 and the body of the plate 42, in which are trapped a pair of adjusting knobs 74 threadedly engaged with the screws 78. The volumes of the trap chambers 44 are adjusted by appropriate movement of the blocks 46 by the knobs 74, and the parts are locked in adjusted relation by a pair of lock nuts 76 threaded on the screws 78 outside the extension 72. A gib 110 secured by screws 111 increases the rigidity of the extension.

In sliding from the position shown in FIG. 1 toward alignment of the trap chambers 44 with the discharge ports 50, the charging plate 42 shears across the shot supply column extending up into the outlet openings 40, and it often occurs that some of the shot become trapped between the adjacent edges of the parts at the interface between the plane sliding surfaces 128 and 140. This has resulted, in previously known shot chargers, in shearing shot materials such as lead; but tends to cause jamming and destructive damage when steel or iron shot is being loaded.

Figure 6:
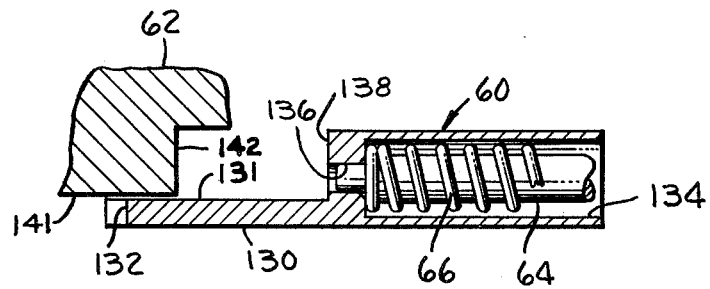
FIG. 6 is a sectional view in side elevation of the shear slide member, shown in relation to a fragmentary portion of the dispenser.
Figure 7:
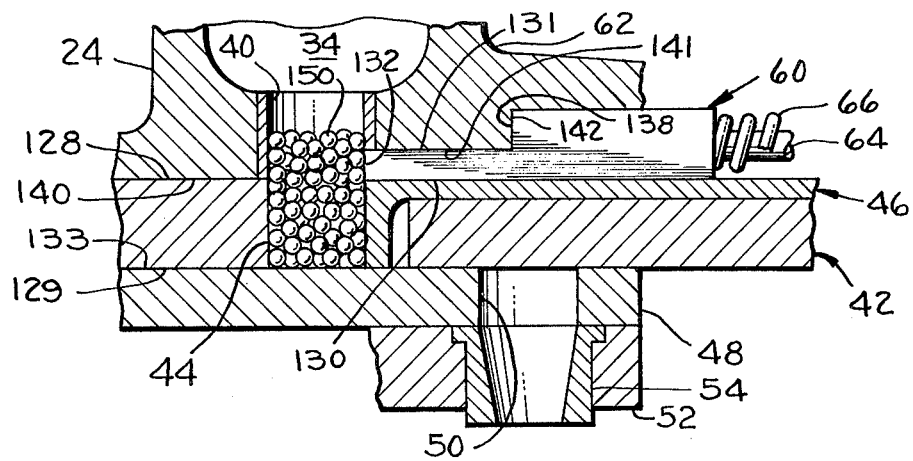
FIGS. 7–10 are fragmentary sectional views in side elevation showing the elements of the dispenser in successive stages of operation.
Figure 8:
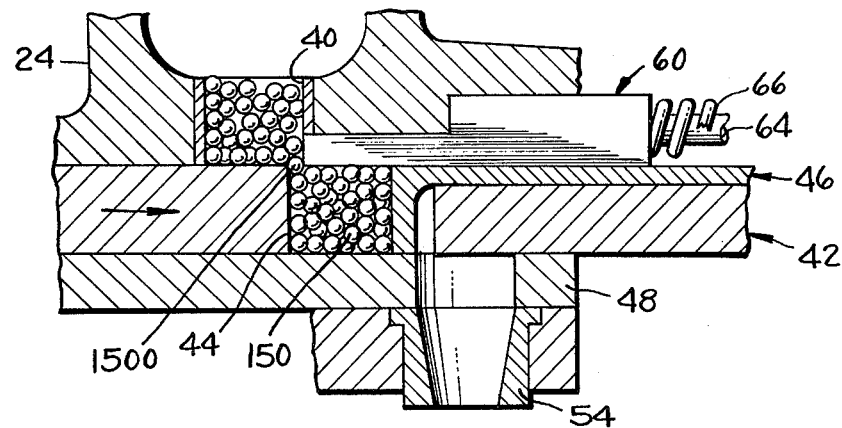
Figure 9:
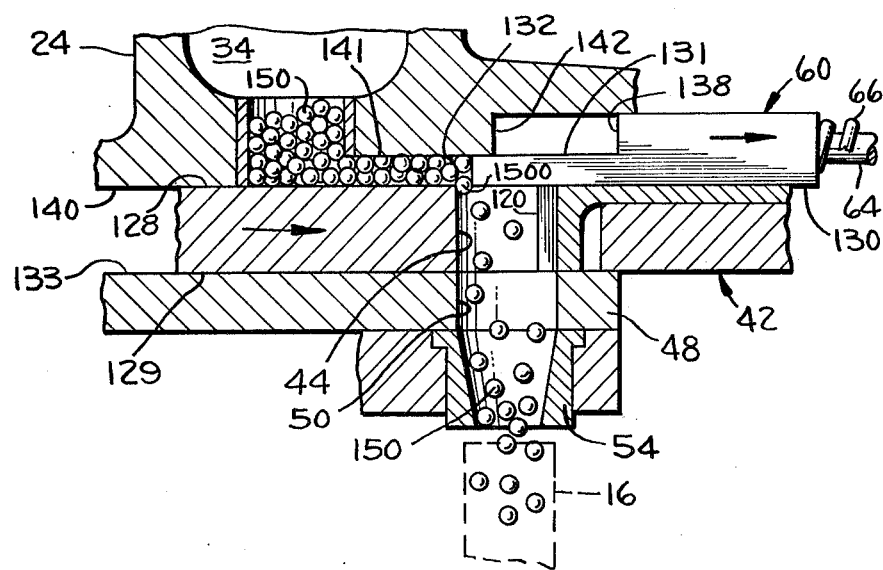
Figure 10:
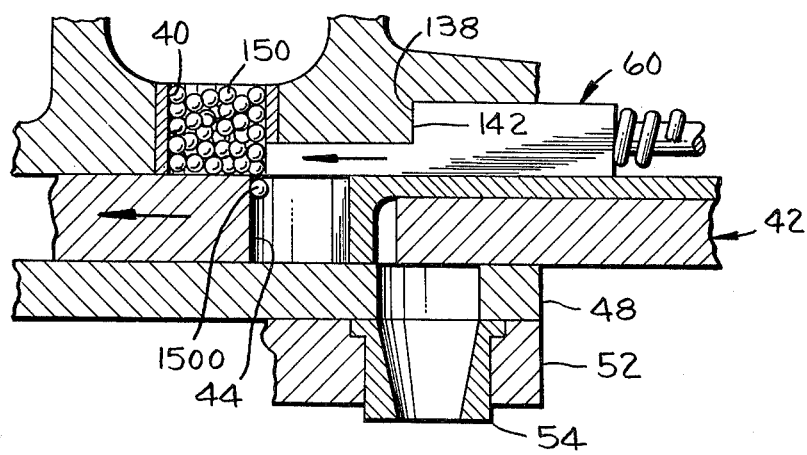

To overcome this difficulty, I provide yieldable shear slide means comprising a pair of slides 60, of which one is shown in FIGS. 1, 5, 6, and 7–10. Each slide 60 is formed with an arcuate lip 132 which normally defines a flush portion of the wall of the loading passage 40, 44 interposed between the outlet opening 40 and the trap chamber 44. Parallel planar surfaces 130 and 131 extend from the lip 132, surface 131 joining a transverse top surface 138. In the construction of FIGS. 1—10, each slide 60 is slidably mounted in a stepped recess formed in an extension 62 of the hopper 24, and having a plane surface 141 parallel to the surface 40 for guiding the slide for reciprocation parallel to the charging plate 42. A compression spring 66 biases each slide to the left as viewed in FIGS. 1, 6, and 7–10, toward a normal position in which the stop surface 138 engages a shoulder 142 of the stepped recess in the hopper, and the lip 132 is flush with the loading passage 40, 44. The spring is received in a blind bore 134 formed in the slide 60, and guided by a pin 64 engaged at one end in a hole 136 in the slide and slidably supported at the other end in a retainer bracket 68 attached to the hopper extension 62. Thus each slide 60 is movable to the right away from its normal position shown in FIGS. 1, 7, 8, and 10, toward retracted positions such as illustrated in FIGS. 6 and 9, by application of forces sufficient to compress he springs 66.

The operation of the improved shot charger or dispenser can best be described by reference to FIGS. 7–10, showing successive relative positions of the moving parts. The charging plate 42 is shown in FIG. 7 in a first position in which the trap chambers 44 are aligned with the hopper outlet openings 40, so that a column of shot 150 flows downwardly from the hopper to fill the trap chambers. The charging plate is continuously reciprocated between the first terminal position of FIG. 7 and a second terminal position shown in FIG. 9, in which the trap chambers 44 are vertically aligned with the discharge ports 50, to meter and deliver succesive charges of shot. The surfaces 128 and 129 of the charging plate slide back and forth against the parallel stationary surfaces 133 and 140 while preventing the shot from escaping. The surfaces 130 and 131 permit sliding motion of the shear slides 60 against the parallel surfaces 128 and 141 when sufficient force is applied to compress the springs 66 and displace the shear slides from their normal positions shown in FIGS. 7, 8, and 10, with the stop 138 resting against the shoulder 142.

The motion of the charging plate 42 in the direction shown by the arrow in FIG. 8 divides the column of shot 150 along the plane of the surfaces 128, 140. It frequently occurs that one or more shot become trapped between the relativelymoving parts at the level of this plane, as illustrated by a shot at 1500. Continuing motion of the charging plate drives the corresponding shear slide 60 with it, compressing the spring 66, rather than jamming the charging plate or shearing the shot 1500 into pieces.

When the charging plate reaches the terminus of its stroke as shown in FIG. 9, with the trap chambers 44 aligned with the ports 50, the trapped shot 1500 does not fall into the waiting shell 16 with the balance of the metered charge, but continues to be held by the compression of the spring 66 between the elements 42 and 60. Consequently the excess charge represented by the trapped shot is not added to the metered charge delivered. Instead, it is returned with the charging slide and the shear slide when they move in the direction shown by the arrows in FIG. 10 toward their original positions, and falls into the trap chamber when the charging slide continues its return stroke after the motion of the shear slide is arrested by abutment of the stop 138 against the shoulder 142. The trapped shot 1500 merely takes its place in the next metered charge, so that it adds nothing to the metered volumes. It will be seen in FIG. 9 that some shot pour into a gap between the surfaces 128 and 141 when the shear slide 60 is displaced from its normal positon, but these are pushed back into the reservoir by the return stroke of the shear slide.

Figure 11:
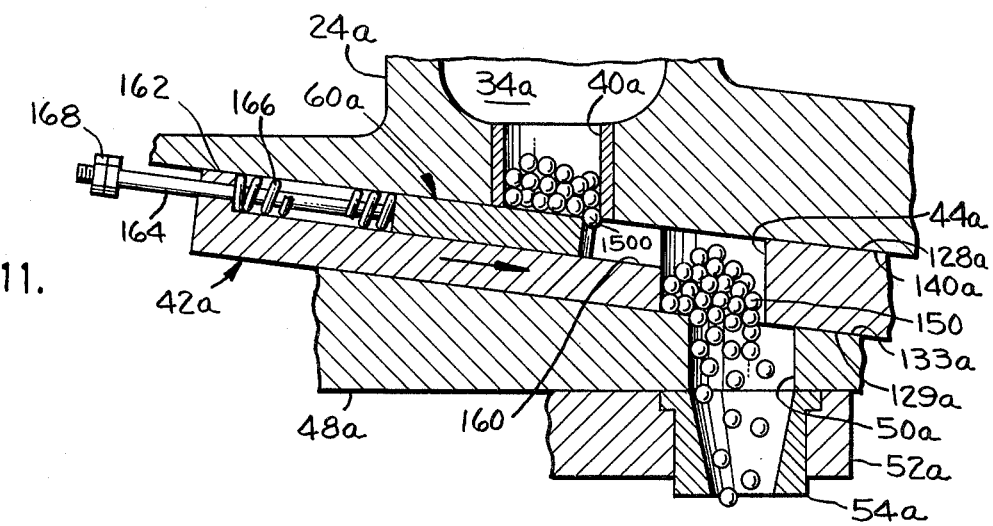
FIG. 11 is a fragmentary sectional view in side elevation showing a modified form of the dispenser in one stage of operation.

In a modification shown in FIG. 11, one or more shear slides 60a are mounted in a recess on the charging plate 42a, rather than in the hopper housing 24a. In this figure parts similar to those of the preceding embodiment are similarly numbered, with the subscript a. In this case, a recessed plane surface 160 on the charging plate 42a receives the shear slide 60a for displacement parallel to the sliding surfaces 128a, 129a, 133a, and 140a, which are inclined from the horizontal. The shear slide is biased toward the right in FIG. 11 by a compression spring 166; this displacement is limited to a normal position aligned with the trap chamber 44a by adjusting nuts 168 threaded on a stud 164 attached to the shear slide and slidably received through a lug 162 on the charging plate.

The charging slide 42a is reciprocable as before between terminal positions aligning the trap chamber 44a with the opening 40a or the discharge port 50a, and is shown in FIG. 11 in an intermediate position as it moves in the direction of the arrow to discharge a metered volume of the shot 150. A shot 1500 is shown trapped by this movement between the hopper housing 24a and the shear slide 60a this has halted the movement of the shear slide and compressed the spring 166. As in the preceding form, the trapped shot is held back from the metered shot delivery, and dropped into the trap chamber 44a only when it returns to the first position for receiving another load of shot. The inclination to the horizontal of the surfaces guiding the charging slide 42a and the shear slide 60a insures that all the shot included in each metered charge will be delivered through the funnel 54a, and none will remain on the surface 160 when the shear slide is held back as illustrated by trapped shot 1500. An alternative is to make the sliding surfaces cylindrical, curving downwardly from the outlet openings 40a to the discharge ports 50a.

In another construction shown in FIG. 2, useful in machines having two alternately-served discharge ports 50b and funnels 54b, a charging plate 42b is reciprocable between two extreme positions aligning a trap chamber 44b with either of the discharge ports. The trap chamber is loaded as it passes beneath a central outlet 40b. In this case two of the shear slides 60b are provided, one arranged on either side of the outlet 40b. These shear slides act independently, one for either direction of displacement of the trap chamber 44b from the outlet 40b, but each operates in the same manner as the single shear slide of FIGS. 1–10.

Figure 13:
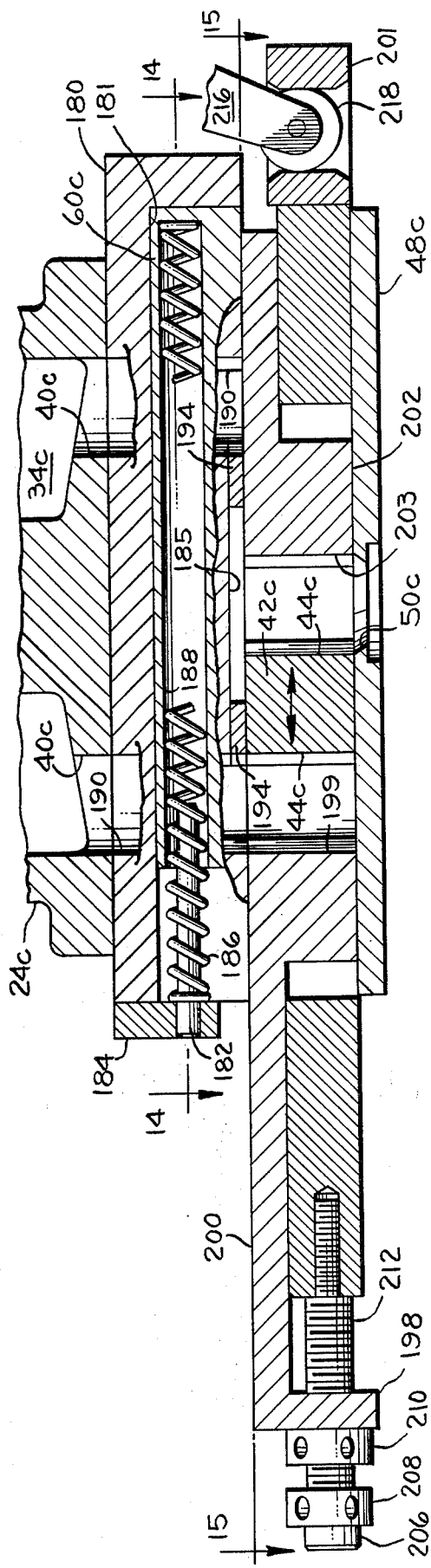
Figure 14:
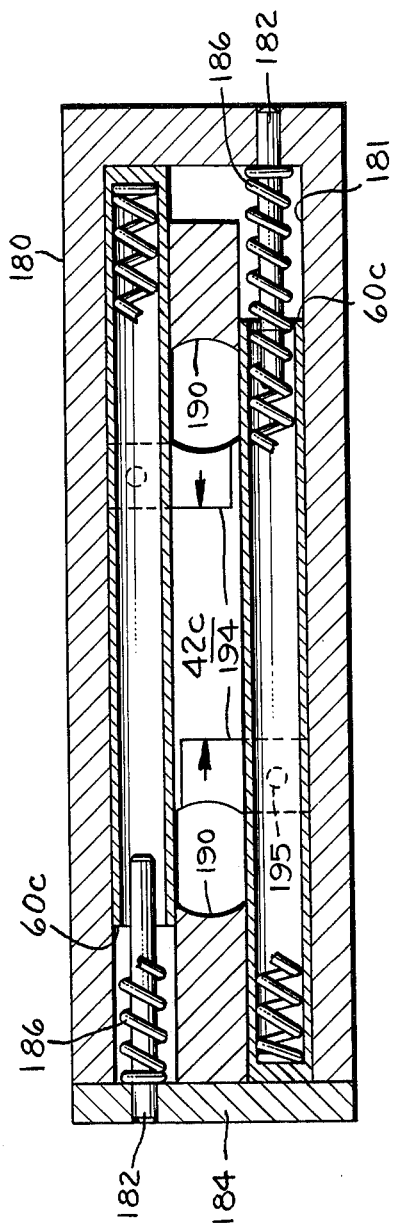
FIG. 14 is a sectional plan view taken along line 14—14 in FIG. 13, looking in the direction of the arrows.
Figure 15:
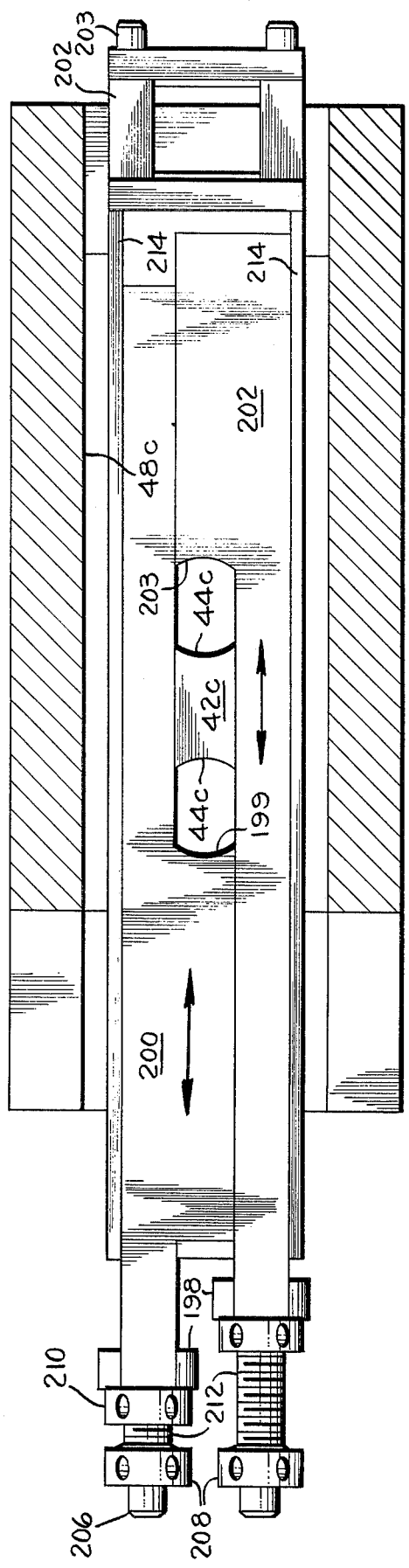
FIG. 15 is a sectional plan view taken along line 15—15 in FIG. 13, looking in the direction of the arrows.

Another construction is shown in FIGS 13–15, in which parts similar to those of preceding embodiments are similarly numbered, with subscripts C. This embodiment increases the permissible dispensing rate by providing two trap chambers 44c in the charging plate 42c, alinged in the direction of its reciprocation, and two outlets 40c in the supply hopper 24c, for alternate deliveries to a single discharge port 50c. An intermediate fixed block 180 has bores 190 extending the outlets 40c to communicate with the trap chambers 44c. The port 50c is centered between the openings 40c, and the spacing between the centers of the trap chambers 44c is equal to that between the center of the port 50c and either of the two hopper outlets 40c.

The charging plate 42c is shown in one terminal position, in which the left-hand trap chamber 44c is aligned beneath the left-hand outlet 40c for loading that chamber, while the right-hand trap chamber is aligned above the discharge port 50c for discharging a metered load of shot. The charging plate 42c is reciprocable, by means of a bell-crank 216 having a roller 218 engaged in a yoke 201 attached to one end of the charging plate, between the illustrated position and a second terminal position in which the right-hand trap chamber 44c is aligned beneath the right-hand outlet 40c for refilling with a fresh charge of shot, while the left-hand trap chamber drains its load into the port 50c. Thus the frequency of metering and delivering shot charges is doubled for any given period of cycling of the charging plate. An increased shot delivery rate is obtainable without danger of giving the shot too little time to completely fill and drain from the trap chambers, since the time allowed for the charging plate to dwell in its terminal positions can be increased.

The volumes of the trap chambers 44c are adjustable by means similar to those shown in FIGS. 1–4, modified to accomodate the revised positions of the trap chambers, alinged along the axis of reciprocation of the charging slide 42c. These means include blocks 200 and 202 slidably received between parallel flanges 214 of the charging plate, for independent adjustment in the directions shown by the arrows in FIG. 15. The block 200 has a lateral projection forming an arcuate lip 199 cooperating with the left-hand trap chamber 44c, and the block 202 has a projection with a lip 203 adjoining the right hand trap chamber, so that the volumes of these chambers can be independently adjusted by repositioning the blocks. Each block extends into a depending leg 198, through which an adjusting screw 212 terminating in a knob 208 is threaded into abutment against the plate 42c. Each adjusting screw 212 has an axial bore through which a mounting screw 206 is freely received and threaded into the plate 42c, rotatably supporting the adjusting screw in a fixed position. Locking knobs 210 are provided to secure the blocks 200 and 202 in their adjusted positions relative to the plate 42c.

A pair of shear slides 60c (FIGS. 13 and 14) is slidably mounted in mating recesses 181 formed in the block 180, one lying to either side of the bores 190. Each slide has a lip-forming arm 194 secured thereto by a screw 195, and projecting laterally through a recess 185 (FIG. 13) at the bottom of the block 180 into alignment with the wall of a corresponding bore 190. The slides 60c are biased toward the positions illustrated by compression springs 86 received therein and located at their free ends by pins 182, one mounted in the block 180 and the other in an end closure plate 184 attached thereto. As the charging plate 42c reciprocates, any shot which it traps against either of the arms 194 will cause that arm and the attached slide 60c to retract in a direction shown by a corresponding arrow in FIG. 14. On the return stroke, the trapped shot will be retained by the displaced arm until it is permitted to reach its normal illustrated position, when the trapped shot will be released into the adjacent chamber 44c to form part of the next shot charge to be metered. It will be apparent that an arrangement of double trap chambers as shown in FIGS. 13–15, may if desired be duplicated to simultaneously meter shot to two discharge ports 50c arranged like those shown in FIG. 2, that is, aligned transversely to the direction of reciprocating movement of the charging plate 42c.

While it is preferred that the spacing between the trap chambers 44c, and the location of the port 50 c midway between the outlets 40c, be as illustrated so that one trap chamber is loaded while the other drains, these passages could be unsymmetrically arranged if desired. The outlets 40c could also be connected to separate supply hoppers for different particulate materials, as for example where it is desired to load a shell with different sizes of shot, or with shot and a filler material.

While the charging plates and shear slides which have been described are arranged for rectilinear reciprocation it should be noted that these parts may alternatively be oscillating, pivoted members.

What is claimed is:

1. A dispenser for metering discrete predetermined volumes of particulate material, comprising, in combination:

supply hopper means for containing particulate material, said supply hopper means having an outlet opening communicating with a lower surface thereof;

means forming an upper surface confronting said lower surface and spaced beneath said supply hopper means, said upper surface being interrupted by a discharge port spaced laterally away from said outlet opening;

charging plate means for metering and dispensing material from said supply hopper to said discharge port, said charging plate means being located between said supply hopper and said upper surface-forming means or reciprocating movement relative thereto;

said charging plate means being formed with a trap chamber of predeterminded volume extending therethrough, and being reciprocably movable between a first position in which said trap chamber is aligned beneath said outlet opening for receiving a charge of particulate material therefrom, and a second postion in which said trap chamber is aligned above said discharge port for delivering said charge thereto;

and shear slide means for preventing shearing of said particulate material, said shear slide means being interposed between said supply hopper and said charging plate means and supported for reciprocating movement, in directions parallel to said movements of said charging plate means, between a normal position and retracted position, said shear slide means having a lip portion receivable between and cooperable with said outlet opening and said trap chamber to define a loading passage therewith when said shear slide means is in said normal position and said charging plate means is in said first position;

said shear slide means and said charging plate means being formed with surfaces closely mating with said lower and upper surfaces for preventing said particulate material from escaping therebetween during reciprocating movements thereof;

together with means yieldingly biasing said shear slide means to remain in said normal position stationary with respect to said supply hopper means during movement of said charging plate means from said first to said second positions;

said shear slide means being constructed and arranged for movement toward said retracted positions by interference with particulate material trapped between said trap chamber and said lip portion during occlusion of said loading passage by movement of said charging plate means from said first to said second position thereof, and for retaining the trapped material until returned to said normal position by said biasing means during return movement of said charging plate means towards said first positions thereof.

2. A dispenser as recited in claim 1, said lip portion being aligned flush with the wall of said outlet opening in said normal position of said shear slide means, said supply hopper and shear slide means including stop means for limiting displacement by said biasing means of said lip portion at said normal position.

3. a dispenser as recited in claim 1, said lower surface of said supply hopper and said closely-mating surfaces of said shear slide means and charging plate means being parallel planar surfaces.

4. A dispenser as recited in claim 3, said parallel planar surfaces extending substantially horizontally.

5. A dispenser as recited in claim 3, said upper surface being a planar surface parallel to said lower surface and said closely-mating surfaces, and supporting said charging plate for reciprocation.

6. A dispenser for metering discrete predetermined volumes of particulate material, comprising, in combination:

supply hopper means for containing particulate material, said supply hopper means having first and second spaced-apart outlet opening communicating with a lower surface thereof;

delivery means forming an upper surface confronting said lower surface and spaced beneath said supply hopper means, said upper surface being interrupted by a discharge port aligned and centered between said outlet openings;

charging plate means for metering and dispensing material from said supply hopper to said discharge port, said charging plate means being located between said supply means and said delivery means, and mounted for reciprocating linear movement parallel to said lower and upper surfaces;

said charging plate means being formed with first and second trap chambers of predetermined volumes extending therethrough and spaced apart half the distance between said outlet openings, said charging plate means being mounted for reciprocating linear movement between a first position in which said first trap chamber is aligned beneath said first outlet opening and receiving a charge of particulate material therefrom and said second trap chamber is aligned above said discharge port for delivering a charge of particulate material thereto, and a second position in which said first trap chamber is aligned above said discharge port and said second trap chamber is aligned beneath said second outlet opening;

and a pair of shear slide means for preventing shearing of said particulate material, said shear slide means being interposed between said supply hopper means and said charging plate means and supported for independent reciprocating linear movement parallel to said movement of said charging plate means, each between a normal position and a retracted position, together with means yieldingly biasing each of said shear slide means toward said normal position thereof;

each of said shear slide means having a lip portion each respectively receivable between and cooperable with a different one of said outlet opening and a different one of said trap chambers to define a loading passage therewith when the corresponding shear slide means is in said normal position and the corresponding outlet opening and trap chamber are aligned with one another;

said shear slide means and said charging plate means being formed with surfaces closely mating with said lower surface for preventing said particulate material from escaping therebetween during reciprocating movements thereof;

each of said shear slide means being constructed and arranged for movement toward said retracted position thereof by interference with particulate material trapped against said lip portion thereof during occlusion of the corresponding one of said loading passages by movement of said charging plate means between said first and said second positions thereof, and for retaining the trapped material until returned to said normal position thereof by said biasing means by a reverse movement of said charging plate means.

7. A dispenser for metering discrete predetermined volumes of particulate material, comprising, in combination:

supply hopper means for containing particulate material, said supply hopper means having a downwardly-directed outlet opening and including means for feeding particulate material to said outlet opening for delivery by gravity;

delivery means forming a discharge port spaced laterally from and below said outlet opening for receiving and delivering particulate material by gravity;

charging plate means for metering and dispensing material from said supply hopper to said discharge port, said charging plate means being interposed between said supply means and delivery means and supported for reciprocating linear movement relative thereto in a fixed path with a horizontal component of direction between first and second positions, said charging plate means being formed with a trap chamber extending therethrough with a vertical component of direction, said trap chamber aligned beneath said outlet opening in said first position to define a loading passage therewith, and being located above said discharge port in said second position;

a selected one of said supply hopper means and said charging plate means being formed with a recess communicating with said loading passage and extending therefrom along said fixed path in the opposite direction to the relative movement of said selected one with respect to the unselected one of said supply hopper means and said charging plate means as said charging plate means moves from said first to said second position;

and shear slide means for preventing shearing of said particulate material, said shear slide means being interposed between said supply hopper means and said charging plate means and received in said recess, said shear slide means being formed with a lip portion, and with upper and lower surfaces respectively closely mating with said supply hopper means and said charging plate means to prevent the escape of particulate material therebetween, said shear slide means being slidable in said recess for reversible linear movement in a fixed path parallel to said path of movement of said charging plate means, to and from a terminal position in which said lip portion is flush with said loading passage in said first position of said charging plate means;

means yieldingly biasing said shear slide means to remain in a normal position stationary with respect to said selected one of said supply means and said charging plate means during reciprocating movements of the latter;

said shear slide means being constructed and arranged to be displaced from said normal position along said fixed path thereof by interference with any particular material trapped between said shear slide means and said unselected one of said supply means and said charging plate means during movement of said charging plate means from said first toward said second position thereof, and to retain said material trapped until said shear slide means is restored to said terminal position thereof by said biasing means upon a return movement of said charging plate means from said second toward said first position thereof.

8. A dispenser as recited in claim 7, in which said selected one comprises said supply hopper means, said recess extends in said supply hopper means in the direction from said first toward said second positions of said charging plate means, and said biasing means urges said shear slide means to remain stationary with respect to said supply hopper means.

9. A dispenser as recited in claim 2 in which said selected one comprises said charging plate means, said recess extends in said charging plate means in the direction from said second toward said first positions of said charging plate means, and said biasing means urges said shear slide means to remain stationary with respect to said charging plate means.

10. A dispenser as recited in claim 9, in which said fixed path of reciprocating movement of said charging plate means is inclined downwardly from said first toward said second positions thereof.

* * * * *

UNITED STATES PATENT AND TRADEMARK OFFICE
CERTIFICATE OF CORRECTION

PATENT NO. : 4,022,353
DATED : May 10, 1977
INVENTOR(S) : ROBERT N. HAMLIN

Page 1 of 2

Figure 12:
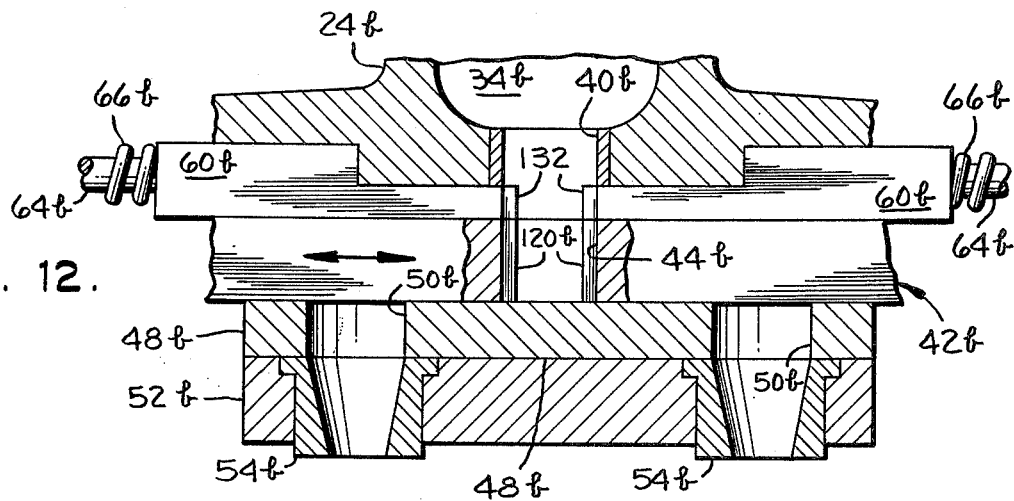
FIG. 12 is a fragmentary sectional view in side elevation showing another construction of the dispenser having two discharge ports for delivering shot to two different locations.

It is certified that error appears in the above-identified patent and that said Letters Patent are hereby corrected as shown below:

Col. 1 Line 21, "tunnel" should read as "funnel";
Col. 3 Line 58, "Fig. 3" should read as "Fig. 13";
Col. 4 Line 10 "rack" should read as "track";
Col. 4 Line 57 "chamber" should read as "chambers";
Col. 5 Line 21 "shot" should read as "slot";
Col. 5 Line 25 "bore 22" should read as "bore 122";
Col. 5 Line 61 "surface 40" should read as "surface 140";
Col. 6 Line 8 "he springs 66" should read as "the springs 66";
Col. 7 Line 30 "Fig. 2" should read as "Fig. 12";
Col. 7 Line 44 "subscripts C" should read as "subscripts c";
Col. 8 Line 39 "springs 86" should read as "springs 186";
Col. 9 Line 20 "or reciprocating" should read as "for reciprocating";
Col. 9 Line 37 "retracted position" should read as "retracted positions";
Col. 9 Line 64 "positions" should read as "position";
Col. 10 Line 18 "opening" should read as "openings";
Col. 10 Line 38 "and receiving" should read as "for receiving";
Col. 10 Line 58 "opening" should read as "openings";
Col. 11 Line 32 after "chamber" insert --being--;
Col. 12 Line 5 "particulatematerial" should read as "particulate material";
Col. 12 Line 20 "particular" should read as "particulate";

UNITED STATES PATENT OFFICE
CERTIFICATE OF CORRECTION

Patent No. 4,022,353  Dated May 10, 1977

Inventor(s) ROBERT N. HAMLIN

It is certified that error appears in the above-identified patent and that said Letters Patent are hereby corrected as shown below:

Col. 12, line 38, "claim 2" should read as "claim 7".

Signed and Sealed this twenty-sixth Day of July 1977

[SEAL]

Attest:

RUTH C. MASON
Attesting Officer

C. MARSHALL DANN
Commissioner of Patents and Trademarks